United States Patent [19]

Skotnicki

[11] Patent Number: 5,507,376
[45] Date of Patent: Apr. 16, 1996

[54] SYNCHRONIZER WITH SELF-ENERGIZING

[75] Inventor: George Skotnicki, Rochdale, England

[73] Assignee: Eaton Corporation, Cleveland, Ohio

[21] Appl. No.: 347,973

[22] Filed: Dec. 1, 1994

[30] Foreign Application Priority Data

Dec. 2, 1993 [GB] United Kingdom ............... 9324756

[51] Int. Cl.⁶ .................................................. F16D 23/06
[52] U.S. Cl. ...................... 192/48.91; 74/339; 192/53.34
[58] Field of Search ............................... 192/53 F, 48.91; 74/339

[56] References Cited

U.S. PATENT DOCUMENTS

| | | | |
|---|---|---|---|
| 3,548,983 | 12/1970 | Hiraiwa | 192/53 F |
| 4,445,602 | 5/1984 | Chana | 74/339 X |
| 4,732,247 | 3/1988 | Frost | 192/53 F |
| 4,836,348 | 6/1989 | Knödel et al. | 74/339 X |
| 5,092,439 | 3/1992 | Reynolds | 192/53 E |
| 5,425,437 | 6/1995 | Nellums | 192/53 F |

Primary Examiner—Rodney H. Bonck
Attorney, Agent, or Firm—Paul S. Rulon

[57] ABSTRACT

A baulkring-type synchronizer (18) for frictionally synchronizing and positive connecting gears (14,16) to a shaft (12). The synchronizer includes a plurality of tabs (54,56) with self-energizing ramps (54a,54b and 56a,56b) which react synchronizing torque to self-energizing ramps defined by an axially slidable shift sleeve (34) secured against rotation relative to the shaft. Synchronizing is provided by cone clutch surfaces (24,48) and (26,50) which are engaged by an operator shift force ($F_o$) and an additive force ($F_a$), which forces are both applied to the cone clutch surfaces via angled blocker teeth surfaces (36a,44a and 36b,46a).

3 Claims, 2 Drawing Sheets

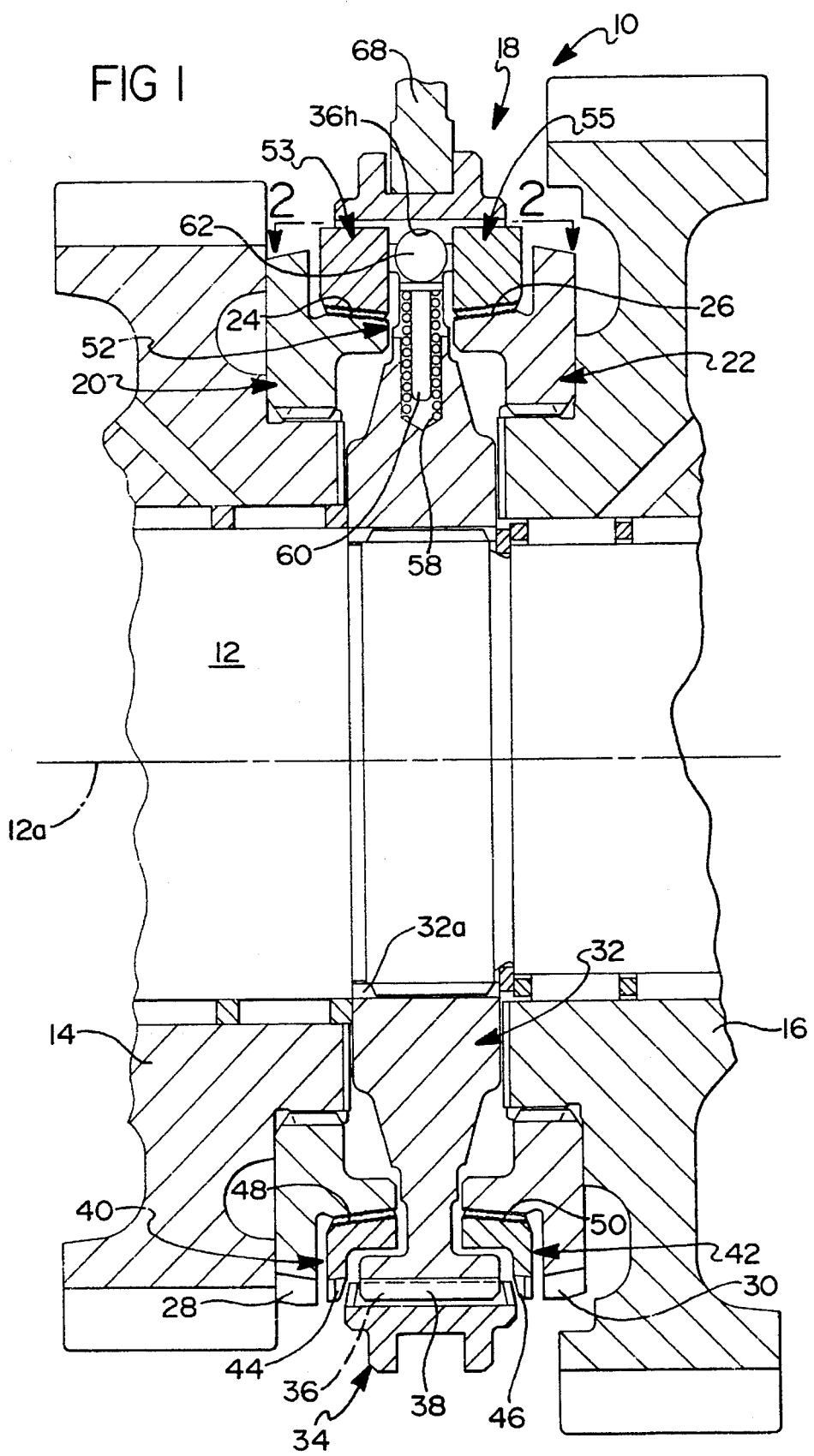

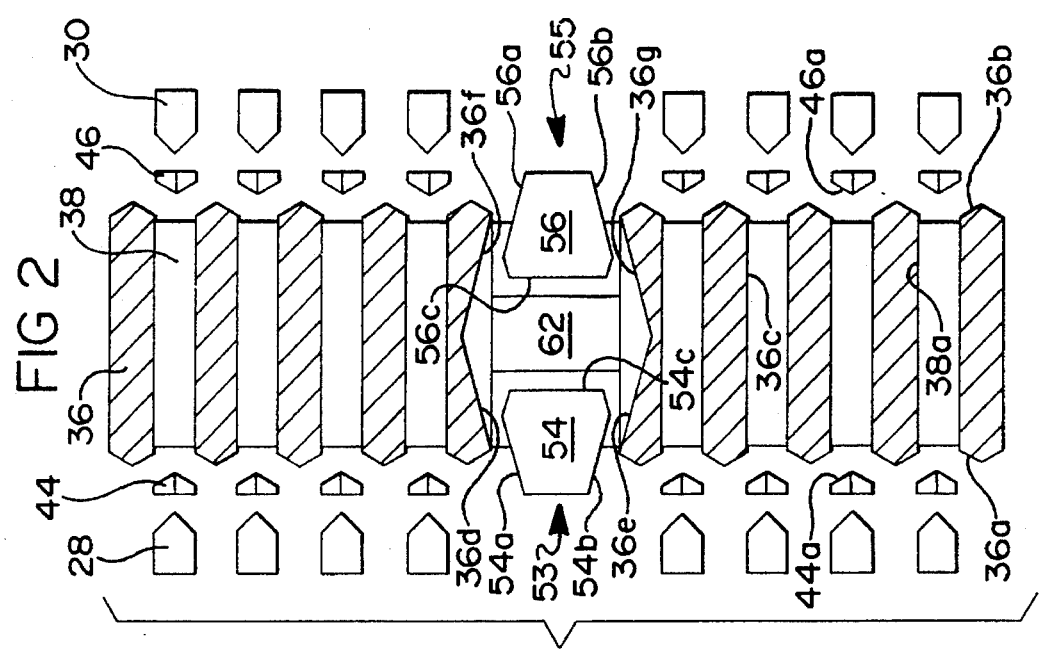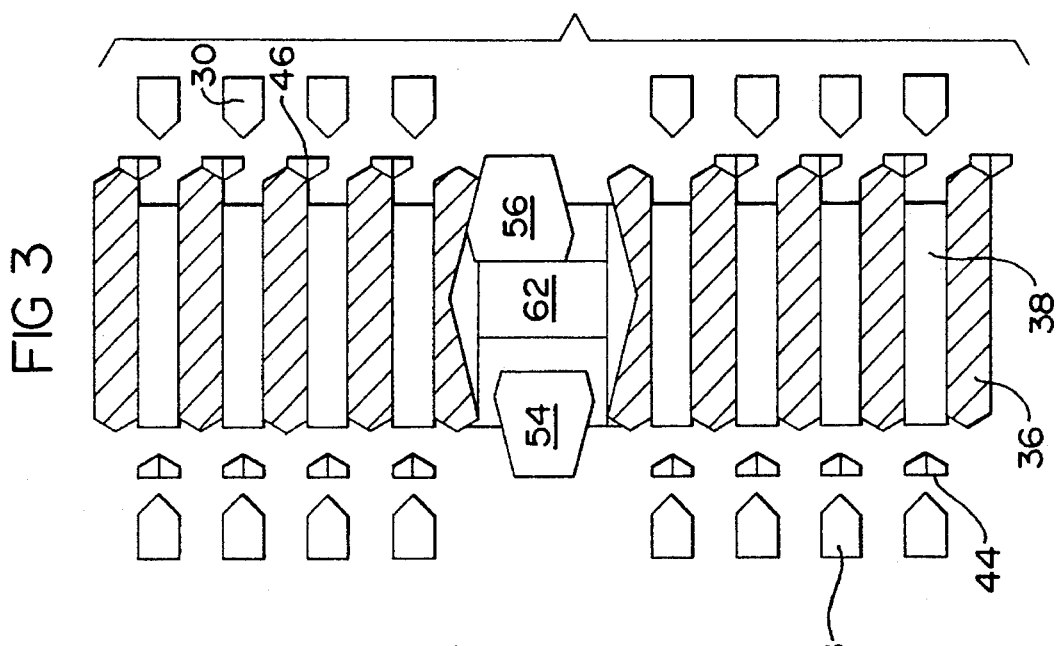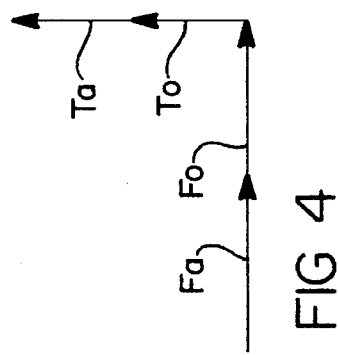

SYNCHRONIZER WITH SELF-ENERGIZING

FIELD OF THE INVENTION

This invention relates to a baulkring-type synchronizer having self-energizing.

BACKGROUND OF THE INVENTION

Baulkring-type synchronizer mechanisms for use in multi-ratio transmissions are well known. Such mechanisms include pairs of friction and jaw members for respectively synchronizing and positive clutching a gear to a shaft, pre-energizer assemblies for engaging the friction members in response to initial engaging movement of a shift sleeve, a hub rotatably fixed to the shaft and having external spline teeth slidably receiving internal spline teeth of the shift sleeve which often defines one of the jaw member pairs, a baulkring having blocker teeth for arresting engaging movement of the shift sleeve until synchronization is reached and for transferring a shift force from the sleeve to increase the engaging force of the friction members.

It is also known in the multiple ratio transmission art that synchronizer mechanisms may be used to reduce shift time of all or some of the transmission gear ratios. It is also known that the shift effort required by a vehicle operator, i.e., force applied to a shift lever, may be reduced by use of synchronizer mechanisms of the self-energizing type. Since operator shift effort generally increases with vehicle size and weight, synchronizer mechanisms of the self-energizing type are especially important for trucks, particularly for heavy duty trucks. A baulkring-type synchronizer of the self-energizing type may be seen by reference to U.S. Pat. No. 3,548,983, which is incorporated herein by reference. A pin-type synchronizer of the self-energizing type may also be seen by reference to U.S. Pat. No. 5,092,439, which is also incorporated herein by reference.

SUMMARY OF THE INVENTION

An object of this invention is to provide a baulkring-type synchronizer with improved self-energizing.

According to a feature of the invention, a clutch frictionally synchronizes and positive connects first and second drives disposed for relative rotation about a common axis. The clutch comprises first jaw means movable from a neutral position to an engaged position with a second jaw means for positive connecting the drives in response to engaging movement of the first jaw means by an axially directed first shift force $F_o$. The first jaw means includes a central opening having internal splines with axially extending flank surfaces slidably mating continuously with axially extending flank surfaces of external splines for preventing relative rotation between the internal and external splines. The external splines are affixed against rotation and axial movement relative to the first drive. First friction means are axially movable into engagement with second friction means in response to the engaging movement of the first jaw means for preventing asynchronous engagement of the jaw means, for transmitting the shift force $F_o$ to the first friction means to effect an engagement force of the friction means, and for producing a torque counter to the synchronizing torque for moving the first and second blocker means out of engagement as synchronization is reached. First and second self-energizing means are operative when engaged to react the synchronizing torque to produce an additive axial force $F_a$ in the direction of the shift force $F_o$ for increasing the engagement force of the friction means in response to synchronizing torque in one direction. The first and second self-energizing means include means for directing the additive axial force $F_a$ to the first friction means via the blocker means.

The improvement is characterized by a hub including an outer circumference defining the external splines. A baulkring includes the first friction surface and a plurality of second blocker surfaces defining the second blocker means. The baulkring is axially movable away from the hub toward the second friction means. The central opening and the internal splines are defined by a shaft sleeve. The internal splines define the first jaw means and axial end of the splines have blocker surfaces defining the first blocker means. A plurality of circumferentially spaced apart and radially aligned openings are formed between the external and internal splines of the hub and sleeve. Each opening has first and second circumferentially spaced apart ends defining each opening width. The first end of each opening is defined by a portion of the sleeve and has an angled surface defining the first self-energizing means. The baulkring includes a plurality of tabs extending into the opening, each tab has circumferentially oppositely facing ends defining a tab width which is less than the opening for allowing the first and second blocker means to move in and out of engagement. One end of each tab has an angled surface defining the second self-energizing means.

BRIEF DESCRIPTION OF THE DRAWINGS

The synchronizer mechanism of the invention is shown in the accompanying drawings, in which:

FIG. 1 is a sectional view of a double-acting synchronizer mechanism in a neutral position;

FIG. 2 is a schematic view looking radially inward along line 2—2 in FIG. 1 with components therein in the neutral position;

FIG. 3 is a schematic view, as is in FIG. 2, with components therein in blocking and self-energizing positions; and FIG. 4 is a graphical representation of axial forces and torques acting on a shift sleeve of the synchronizer mechanism.

DETAILED DESCRIPTION OF THE DRAWINGS

The term "synchronizer clutch mechanism" shall designate a clutch mechanism utilized to non-rotatably couple a selected ratio gear to a shaft by means of a positive clutch in which attempted engagement of the positive clutch is prevented until members of the positive clutch are brought to substantially synchronous rotation by a synchronizing friction clutch associated with the positive clutch. The term "self-energizing" shall designate synchronizer clutch mechanism which includes ramps or cams or the like to increase the engaging force of the synchronizing clutch in proportion to the synchronizing torque of the friction clutch.

Looking now at FIGS. 1–3, therein is shown a gear and synchronizer assembly 10 including a shaft 12 mounted for rotation about a central axis 12a, axially spaced apart gears 14, 16 supported on the shaft for rotation relative thereto and secured against axial movement relative to the shaft in known manner, and a double-acting synchronizer clutch mechanism 18.

The synchronizer clutch mechanism 18 includes annular members 20,22 axially and rotatably affixed to gears 14,16 in known manner, friction surfaces 24,26 defining gear friction members herein integral with members 20,22, jaw teeth 28,30 defining gear jaw members herein integral with members 20,22, a hub member 32 axially and rotatably affixed at a central opening 32a thereof to shaft 12, a shift sleeve 34, internal spline teeth 36 defined on a central opening of sleeve 34 and in constant mesh with external spline teeth 38 defined on the outer circumference of hub 32, baulkrings 40,42, blocker teeth 44,46 and friction surfaces 48,50 herein integral with baulkrings 40,42, a pre-energizer assembly 52, and self-energizing assemblies 53,55.

As is readily seen, friction surfaces 24,48 and 26,50 pair up to define friction clutches for synchronizing the gears to the shaft prior to engagement of the jaw clutch members. Cone clutches are preferred; however, other types of friction clutches may be used. A wide range of cone angles may be used. Cone angles of seven and one-half degrees are employed herein. The friction surfaces may be defined by any of several known friction materials affixed to the base member, e.g., pyrolytic carbon friction materials such as disclosed in U.S. Pat. Nos. 4,700,823; 4,844,218 and 4,778,548 may be used. These patents are incorporated herein by reference.

Opposite ends of shift sleeve spline teeth 36 include angled blocker surfaces 36a,36b which cooperate with mating angled blocker surfaces 44a,46a of baulkring 44,46 for preventing asynchronous engagement of the jaw clutches, for transmitting the shift force $F_o$ to the cone clutch friction surfaces to effect an engagement force producing a synchronizing torque $T_o$ proportional to shift force $F_o$, and for producing a torque counter to the synchronizing torque for moving the blocker teeth out of engagement as synchronization is reached and thereby allowing spline teeth 36 defining axially movable jaw members to engage teeth 28 or 30 of the gear jaw members.

Spline teeth 36 and 38 have axially extending flank surfaces 36c,38a which continuously mate in close sliding relation so that there is relatively no free play between shift sleeve 34 and shaft 12. End portions of the flank surfaces of splines 36 and flank surfaces of gear jaw teeth 28,30 may be provided with a back out or looking angle feature to prevent inadvertent disengagement of the teeth. Details of this feature may be seen by reference to U.S. Pat. No. 4,727,968 which is incorporated herein by reference. Self-energizing assemblies 53,55 each include a plurality of tabs 54,56 (herein three) integral with the baulkrings and extending into openings between the internal and external spline teeth 36,38 of the shift sleeve and the hub. Each opening has a width formed by circumferentially spaced apart ends having self-energizing ramps 36d,36e,36f,36g defined by portions of the shift sleeve. Each tab 54,56 has circumferentially oppositely facing ends 54a,54b and 56a,56b defining a tab width less than the opening width for allowing the baulkring blocker teeth to move in and out of engagement with shift sleeve blocker surfaces 36a,36b and for generating an additive axial force $F_a$ when the tab ramps engage the ramps of the openings. The engaged ramps react synchronizing torque between the baulkrings and shaft 12 for providing the additive axial force $F_a$ to the shift sleeve, which force is then applied to the engaged friction cone clutch via the engaged blocker teeth to increase cone clutch engagement force and provide an additive synchronizing torque $T_a$. The angles of the ramp surfaces may be varied to provide different amounts of additive axial force for up and down shifts and for high and low speed ratios. Also, if no additive axial force is preferred in one direction for one gear or more, the ramp surfaces may be parallel to the spline, i.e., no effective ramp surfaces are provided. The magnitude or amount of the axial additive forces, as explained further hereinafter, is also a function of the mean radii ratio of friction clutches and self-energizing ramps. Accordingly, the magnitude of the additive forces for a given shift force applied to shift sleeve 34 by a shift fork may be varied by varying the ramp angles and/or the mean radii ratio.

Each pre-energizer assembly 52, which is known in the art, includes a helical compression spring 58 and plunger 60 disposed in a radially extending blind bore and biasing a roller or ball 62 (herein a roller) into an annular detent groove 36h in sleeve splines 36. Pre-energizer assembly 52 resiliently positions shift sleeve 34 in the neutral position shown in FIGS. 1 and 2. Rollers 62 are axially spaced between abutment surfaces 54c,55c of the tabs 54,56 formed integral with baulkrings 40,42. When it is desired to couple either gear to the shaft, an appropriate and unshown shift mechanism, such as disclosed in U.S. Pat. No. 4,920,815 and incorporated herein by reference, moves shift sleeve axially via partially shown shift fork 68 along the axis of shaft 12 either left to couple gear 14 or right to couple gear 16. The shift mechanism may be manually moved by an operator through a linkage system, may be selectively moved by an actuator, or may be moved by means which automatically initiate shift mechanism movement and which also controls the magnitude of the force applied by the shift mechanism. When the shift mechanism is manually moved, the force is proportional to the force applied by the operator to a shift lever. Whether manually or automatically applied, the force is applied to shift sleeve 34 in an axial direction and is represented by the length of arrow $T_o$ in FIG. 4.

Initial rightward axial movement of shift sleeve 34 by the operator shift force $F_o$ is transmitted by pre-energizer rollers 62 to baulkring 42 via tab abutment surfaces 56c to effect initial frictional engagement of movable cone surface 50 with gear cone surface 26. The initial engagement force of the cone surface is, of course, a function of the force of spring 58 and the angles of the walls of detent grooves 36h. The initial frictional engagement (provided an asynchronous condition exists and momentarily ignoring the effect of the self-energizing ramps) produces an initial cone clutch engaging force and synchronizing torque $T_o$ which ensures limited relative rotation between shift sleeve 34 and baulkring 42, and hence, movement of blocker teeth 46 to a position wherein the correct angled blocker surfaces of the blocker teeth engage the correct angled blocker surfaces of spline teeth 36. When the blocker surfaces are engaged, the full operator shift force $F_o$ on shift sleeve 34 is transmitted to friction surfaces 26,50 via angled blocker surfaces 36b, 46a, whereby the cone clutch is engaged by the full force of the operator shift force $F_o$ to provide the operator synchronizer torque $T_o$. This operator synchronizing torque $T_o$ is represented by arrow $T_o$ in FIG. 4. Since the blocker surfaces are disposed at angles relative to the axial direction of operator shift force $F_o$, they produce a counter force or unblocking torque which is counter to the synchronizing torque from the cone clutch but of lesser magnitude during asynchronous conditions. As substantial synchronism is reached, the synchronizing torque drops below the unblocking torque, whereby the blocker teeth move out of engagement to allow continued axial movement of the shift sleeve and engagement of movable jaw teeth 36 with gear jaw teeth 30.

Still ignoring the effects of the self-energizing ramps, cone clutch torque provided by the force $F_o$ is expressed by the following equation:

$$T_o = F_o R_c \mu_c / \sin \alpha$$

where:

$R_c$ = the mean radius of the cone friction surface,
$\mu_c$ = the coefficient of friction of the cone friction surface, and
$\alpha$ = the angle of the cone friction surfaces.

Looking now at the affects of the self-energizing ramps and referring particularly to FIG. 3, the synchronizing torque $T_o$, due to the operator applied axial shift force $F_o$, is of course transmitted to shift sleeve 34 by the angled blocker surfaces and is reacted to shaft 12 across the self-energizing ramp surfaces. The self-energizing ramp surfaces, when engaged, limit rotation of the shift sleeve relative to shaft 12 and produce the axial force component or axial additive force $F_a$ acting on the shift sleeve in the same direction as shift force $F_o$, thereby further increasing the engaging force of the cone clutch to provide the additive synchronizing torque $T_a$ which adds to the torque $T_o$. FIG. 2 illustrates the position of the self-energizing ramp surfaces and the position of the jaw member teeth while shift sleeve 34 is in the neutral position corresponding to the position of FIG. 1. FIG. 3 illustrates a position of the ramps and jaw member teeth while gear 16 is being synchronized by engaged cone surfaces 26,50. The engaged cone surfaces are producing a synchronizing torque in a direction which has effected engagement of tab ramp surfaces 56a with shift sleeve ramp surfaces 36f. Hence, the sum of the axial forces for engaging the cone clutch are $F_o$ plus $F_a$ and the sum of the synchronizing torques being produced by the cone clutch are $T_o$ plus $T_a$, as graphically shown in FIG. 4. For a given operator shift force $F_o$ and an operator synchronizing torque $T_o$, the magnitude of the axial additive force is preferably a function of the angle of the engaged self-energizing ramp surfaces. This angle is preferably great enough to produce an additive force $F_a$ of magnitude sufficient to increase synchronizing torque and decrease synchronizing time in response to a given moderate shift effort by the operator. However, this angle is also preferably low enough to produce a controlled axial additive force $F_a$, i.e., the force $F_a$ should increase or decrease in response to the force $F_o$ increasing or decreasing. If the ramp angle is too great, the ramps are self-locking rather than self-energizing; hence, once initial engagement of the cone clutch is effected, the force $F_a$ will rapidly and uncontrollably increase independent of the force $F_o$, thereby driving the cone clutch toward lockup. Self-locking rather than self-energizing decreases shift quality or shift feel, may over stress synchronizer components, may cause over heating and rapid wear of the cone clutch surfaces, and may even override operator movement of the shift lever.

The main variables for calculating self-energizing ramp angles $\theta$ and for providing additive axial forces $F_a$, which increase or decrease in proportion to operator forces $F_o$, are cone clutch angle $\alpha$, cone clutch coefficient of friction $\mu_c$, mean radii ratio $R_c$ of the cone clutch and $R_r$ of the self-energizing ramps, ramp coefficient of friction $\mu_r$, and pressure angle $\phi$ of the self-energizing ramps. The pressure angle $\phi$ may be zero. Herein, the ramps have a pressure angle of 20 degrees. Further details for calculating and controlling self-energizing or boost forces may be obtained by reference to U.S. Pat. No. 5,092,439 which is incorporated herein by reference.

A preferred embodiment of a synchronizer mechanism with self-energizing has been disclosed. Many variations and modifications of the preferred embodiment are believed to be within the spirit of the invention. The following claims are intended to cover the inventive portions of disclosed mechanism and variations and modifications believed to be within the spirit of the invention.

What is claimed is:

1. A clutch for frictionally synchronizing and positive connecting first and second drives disposed for relative rotation about a common axis; the clutch including:

first jaw means axially movable from a neutral position into an engaged position with second jaw means for positive connecting the drives in response to engaging movement of first jaw means by an axially directed first shift force ($F_o$), the first jaw means including a central opening having internal splines with axially extending flank surfaces slidably mating continuously with axially extending flank surfaces of external splines for preventing relative rotation between the internal and external splines, and the external splines affixed against rotation and axial movement relative to the first drive;

first friction surface axially movable into engagement with second friction surface in response to the engaging movement of the first jaw means for producing a synchronizing torque;

first and second blocker means having angled surfaces movable into engagement in response to the engaging movement of the first jaw means for preventing asynchronous engagement of the jaw means, for transmitting the shift force ($F_o$) to the first friction surface to effect an engagement force of the friction surfaces, and for producing a torque counter to the synchronizing torque for moving the first and second blocker means out of engagement as synchronization is reached;

first and second self-energizing means operative when engaged to react the synchronizing torque for producing an additive axial force ($F_a$) in the direction of the shift force ($F_o$) for increasing the engagement force of the friction surfaces in response to synchronizing torque in one direction, the first and second self-energizing means including means for directing the additive axial force ($F_a$) to the first friction surface via the blocker means; the improvement comprising:

a hub including an outer circumference defining the external splines;

a baulkring including the first friction surface and a plurality of second blocker surfaces defining the second blocker means, the baulkring being axially movable away from the hub toward the second friction surface;

the central opening and internal splines defined by a shift sleeve, the internal splines defining the first jaw means defining the first blocker means;

a plurality of circumferentially spaced apart and radially aligned openings between the external and internal splines of the hub and sleeve, each opening having first and second circumferentially spaced apart ends defining each opening width, and at least the first ends of each opening being defined by a portion of the sleeve and having an angled surface defining the first self-energizing means;

the baulkring including a plurality of tabs extending into the opening, each tab having circumferentially oppositely facing ends defining tab widths less than the opening width for allowing the first and second blocker means to move in and out of engagement, and one end of each tab having an angled surface defining the second self-energizing means.

2. The clutch of claim 1, further including a third drive disposed for rotation about the common axis relative to the first and second drives and axially spaced from the second drive;

the shift sleeve internal splines defining a third jaw means axially movable from a neutral position into an engaged position with a fourth jaw means for positive connecting the first and third drives in response to engaging movement of the shift sleeve by a second shift force ($F_o$) directed axially opposite the first shift force ($F_o$);

a second axially movable baulkring including a third friction surface engagable with a fourth friction surface affixed to the third drive and a plurality of fourth blocker surfaces engagable with third blocker surfaces defined by ends of the internal splines axially opposite the first blocker surfaces for preventing asynchronous engagement of the third and fourth jaw means, for transmitting the second shift force ($F_o$) to the third friction surface to effect an engagement force with the fourth friction surface, and for producing a torque counter to the synchronizing torque for moving the third and fourth blocker surfaces out of engagement as synchronization is reached;

the second baulkring including a plurality of second tabs extending into the openings and axially spaced from the first tabs, each second tab having circumferentially oppositely facing ends defining second tab widths less than the opening width for allowing the third and fourth blocker surfaces to move in and out of engagement, each second tab having an angled self-energizing surface circumferentially movable into an angled self-energizing surface defined by a portion of the sleeve.

3. The clutch of claim 1, wherein:

the second end of each opening is defined by a portion of the sleeve and has an angled self-energizing surface circumferentially engagable with an angled self-energizing surface defined by the second end of the first tab for increasing the engaging force of the first and second friction surfaces in response to synchronizing torque in a direction opposite the one direction.

* * * * *